US006212649B1

(12) United States Patent
Yalowitz et al.

(10) Patent No.: US 6,212,649 B1
(45) Date of Patent: *Apr. 3, 2001

(54) SYSTEM AND METHOD FOR PROVIDING HIGHLY-RELIABLE COORDINATION OF INTELLIGENT AGENTS IN A DISTRIBUTED COMPUTING SYSTEM

(75) Inventors: Jeffrey S. Yalowitz; Robert S. Daniel, III, both of Huntsville, AL (US); Laura L. Pullum, Dacula, GA (US); Peter A. Kiss, Huntsville, AL (US)

(73) Assignee: Sentar, Inc., Huntsville, AL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,119

(22) Filed: Dec. 30, 1997

Related U.S. Application Data

(60) Provisional application No. 60/034,518, filed on Dec. 30, 1996.

(51) Int. Cl.[7] ................................................. G06F 11/00
(52) U.S. Cl. ............................................. 714/31; 709/201
(58) Field of Search ................................... 709/201, 202; 714/2, 4, 25–46

(56) References Cited

U.S. PATENT DOCUMENTS

| 4,323,966 | | 4/1982 | Whiteside et al. . |
| 4,841,456 | | 6/1989 | Hogan, Jr. et al. . |
| 5,129,080 | * | 7/1992 | Smith ................................. 395/575 |
| 5,260,945 | * | 11/1993 | Rodeheffer ............................ 371/8.2 |
| 5,321,813 | | 6/1994 | McMillen et al. . |
| 5,349,654 | | 9/1994 | Bond et al. . |
| 5,448,724 | | 9/1995 | Hayashi . |
| 5,504,837 | * | 4/1996 | Griffeth et al. ........................ 395/11 |
| 5,537,653 | | 7/1996 | Blianchini, Jr. . |
| 5,539,877 | | 7/1996 | Winokur et al. . |
| 5,544,310 | * | 8/1996 | Forman et al. ................. 395/183.07 |
| 5,561,759 | | 10/1996 | Chen . |
| 5,581,689 | | 12/1996 | Slominski et al. . |
| 5,592,610 | | 1/1997 | Chittor . |
| 5,592,611 | | 1/1997 | Midgely et al. . |
| 5,655,081 | | 8/1997 | Bonnell et al. . |
| 5,675,723 | | 10/1997 | Ekrot et al. . |
| 5,675,724 | | 10/1997 | Beal et al. . |
| 5,682,470 | * | 10/1997 | Dwork et al. ...................... 395/182.1 |
| 5,790,789 | * | 8/1998 | Suarez ............................ 395/200.32 |
| 5,799,146 | * | 8/1998 | Badovinatz et al. ............. 395/182.02 |

* cited by examiner

Primary Examiner—David A. Wiley
(74) Attorney, Agent, or Firm—Lanier Ford Shaver & Payne P.C.; John E. Whitaker, Esq.; Frank M. Caprio, Esq.

(57) ABSTRACT

The application of a fault tolerance technique to the intelligent agent technology to create a highly-reliable distributed computing system. The present invention relates to the merger of software fault tolerance techniques to cooperative intelligent agents to provide highly reliable coordination of interactions between computer systems, even when data is corrupt, when available information is incomplete, or when synchronization of the computer systems is imperfect. Agents engaged in an interaction exchange information. Received information is acceptance tested to determine if the information indicates the occurrence of a fault. If the information is outside a range of expected values, or otherwise does not take the form of expected information, a fault is indicated. A fault tolerance technique is employed to overcome the fault. One such technique is the retry block software fault technique. Re-expression and re-transmission of the information may be requested.

20 Claims, 8 Drawing Sheets

SYSTEM AND METHOD FOR PROVIDING HIGHLY-RELIABLE COORDINATION OF INTELLIGENT AGENTS IN A DISTRIBUTED COMPUTING SYSTEM

STATEMENT OF PRIORITY FILING DATE

This application claims the benefit of the prior filed and copending U.S. Provisional Application No. 60/034,518, filed Dec. 30, 1996.

STATEMENT OF GOVERNMENT INTEREST

The present invention was made with U.S. Government support under Contract Number F30602-96-C-0129 and Contract Number F30602-97-C-0094 awarded by the United States Air Force. The U.S. Government has certain rights in the present invention.

FIELD OF THE INVENTION

The present invention relates generally to the field of cooperative intelligent agents. More particularly, the present invention relates to the merger of software fault tolerance techniques to cooperative intelligent agents to provide highly reliable coordination of interactions between the agents and their associated systems, even when data is corrupt, when available information is incomplete, or when synchronization of the computer systems is imperfect.

BACKGROUND OF THE INVENTION

Distributed computer systems have increased in sophistication over the years, with more complex functions being performed and more strategic dependence resting on them. The architecture of such systems has evolved from the individual computer to the network. The spatial distribution of integrated functions includes many types of ground centers, as well as aircraft and satellites. The requirements for interoperation are even growing to cross-system boundaries. In military applications, interdependence of air-based and space-based sensors, navigation, communications, and weapons systems is evident in new developments. In civil applications, integration of the formerly separate parts of industrial enterprises is becoming commonplace. Concurrently, automated network based interactions of organizations with suppliers, customers, financial institutions, and government agencies are being established on local, national, and global scales.

The system-wide and intersystem integration of such computer systems requires finctionality and data that are both distributed and networked. Decentralized network architectures incorporating intelligent agent technology are desirable because of the heterogeneity of the mix of operational and developmental systems and the desire to control complexity. However, distributed systems introduce threats to system reliability that centralized systems do not suffer.

As system architectures have evolved toward network infrastructure models, changes in composition have also taken place. The granularity of processing subsystems and software modules is finer in modern systems than in earlier ones, with more dependence on distributed small processor hardware elements and off-the-sbelf software functional blocks, such as database management systems, graphical user interfaces, and network interfaces. The basis of integration has changed from direct interface specification to interface specification via government and industry standards. The standards tend to emphasize the data link and transport aspects of interfaces between processing entities. Typically, the standards do not address the more abstract aspects, such as the session and presentation layers of the ISO/OSI protocol model. Thus, modern distributed systems tend to be loosely coupled in terms of application-to-application interaction, with interfaces executed through messages sent asynchronously between nodes and with handshaking protocols, either nonexistent or negotiated, among designers of the respective applications.

Intelligent agent technology provides a modern approach to the automation of intersystem processes. For the purpose of this discussion, the terms "intelligent agent" or "agent" mean "an entity that functions continuously and autonomously in an environment in which other processes take place and other agents exist" (Shoham 1993). In simple terms, agents are special software programs which autonomously perform tasks for a user. An agent can monitor for a certain condition, decide what to do based on a set of rules provided to it, and take an action based on the rule corresponding to the condition. For example, the agent can monitor a stock price over the Internet and if the price drops below a given value, the agent can automatically purchase that stock at that price. In another example, the agent can be configured to monitor an inventory of a product, and if the inventory falls below a given number, the agent can automatically order more of the product from a supplier.

A characteristic that distinguishes agents from ordinary software is that agents operate at a high level in the abstraction spectrum, using symbolic representation of information, cognitive-like functions, and social behavior conventions to perform their tasks.

Intelligent agents permit information flow between their host systems without the need for direct interfaces between the host systems. The agents facilitate large-scale system dynamics by encapsulating among them the messages, protocols, and state behavior of the interacting systems. Because the agents become integral to the proper intersystem function of the distributed computing system, the agents'reliabiity becomes an important factor in the overall reliability of the distributed computing system and the interaction of the agents.

The integrity of data is critical to the reliability of agent-based distributed computing systems, both for the data owned by the agents and the application data being exchanged. If agents have incorrect data or do not have needed data, the distributed computing system becomes inefficient because the individual agents are not operating as other agents expect. To exacerbate the problem, the operational environment of distributed computing systems can be severe and opportunities for data loss and data corruption are great. Hardware, communications, and on-board memory failures are to be expected, and brute-force reliability is too expensive to guarantee.

Autonomous agents in local systems may use distributed object management ("DOM") techniques to collaborate in the production and utilization of data toward mutual goals. Distributed objects in DOM environments conform to type specifications and have values, as do objects in conventional object-oriented representation systems. The distributed objects in DOM systems differ from conventional objects in that they must contain additional attributes to identify the relationships and locations of their parts.

DOM design policies usually state criteria for access by agents to data owned by other agents and obligations of agents that want data to provide it. The design policies also typically require that DOM services not limit the autonomy of the cooperating agents. These policies conflict to the extent that distributed objects create dependencies among the agents. In fact, they do create dependencies, and the dependencies lead to obligations on the part of the agents. The obligations, if not recognized or taken into account, can induce faults into the distributed objects.

Separately, recent research and development efforts have proven the effectiveness of formal fault tolerance techniques on software in conventional computer system architectures (i.e., non-distributed). Software fault tolerance methods are intended to defend against defects that consist of design flaws or bad data. In general, fault tolerance techniques protect against faults through the controlled use of redundancy. Fault tolerance techniques can be classified as either masking or dynamic, depending on the way redundancy is used. A typical masking technique provides multiple parallel redundant versions of a critical process or creates multiple copies of the data to be handled. The multiple results are applied to a voting or averaging algorithm, and the best result is output as the product of the protected process. A typical dynamic fault tolerance technique has alternative versions of the process or alternative data representation schemes available, but the alternatives are invoked only when faults are detected. For this discussion, the term "fault tolerance" includes fault detection, fault isolation, fault containment, fault correction, and fault masking. For a fuller discussion of data-diverse software fault-tolerance tolerance techniques, the reader is directed to P. E. Ammann and J. C. Knight, "Data Diversity: An Approach to Software Fault Tolerance," IEEE Transactions on Computers Vol. 37, pp. 418–425 (Apr. 1988), incorporated herein by reference.

Unfortunately, existing technology has not addressed the problem of faults, such as corrupt data or communication failures, between agents interacting in a distributed environment. Faults are merely ignored, resulting in less then ideal conclusions to the interactions between the agents. Accordingly, a need exists for a fault-tolerant intelligent agent-based distributed computer system which provides highly-reliable interactions between the agents in the system.

SUMMARY OF THE INVENTION

The present invention combines current fault tolerance techniques and adaptations thereof with cooperative intelligent agent technology and distributed object management methods to achieve enhanced reliability in the cooperative operations of intelligent agents, to achieve enhanced capability, to recognize incipient faults, and to achieve enhanced capability to circumvent or correct incipient faults.

More specifically, the present invention implements the fault tolerance techniques in structures and processes embedded wiin the intelligent agents by employing methods that permit detection and correction of faults that occur as anomalies in the agent-to-agent interactions even when the faults may not be recognized as faults within the individual agents involved in an interaction. The procedures for employment of the fault tolerance techniques are stored within multiple agents as knowledge elements to be invoked by inferencing mechanisms contained within the agents. To the extent that the procedures require action on the part of two or more agents, complementary parts of the procedures stored in different agents will be executed cooperatively, using inter-agent conversation facilities incorporated in the agents.

In one aspect, the present invention combines a data-diverse software fault tolerance technique, such as N-Copy Programming (NCP) or Retry Blocks, with intelligent agent technology and DOM methods to create the capability to detect, diagnose, and recover from faults, thereby achieving enhanced reliability.

Pig. 3 is a functional block diagram of a distributed computing system having agents configured in accordance with an exemplary embodiment of the present invention.

Figure 4:
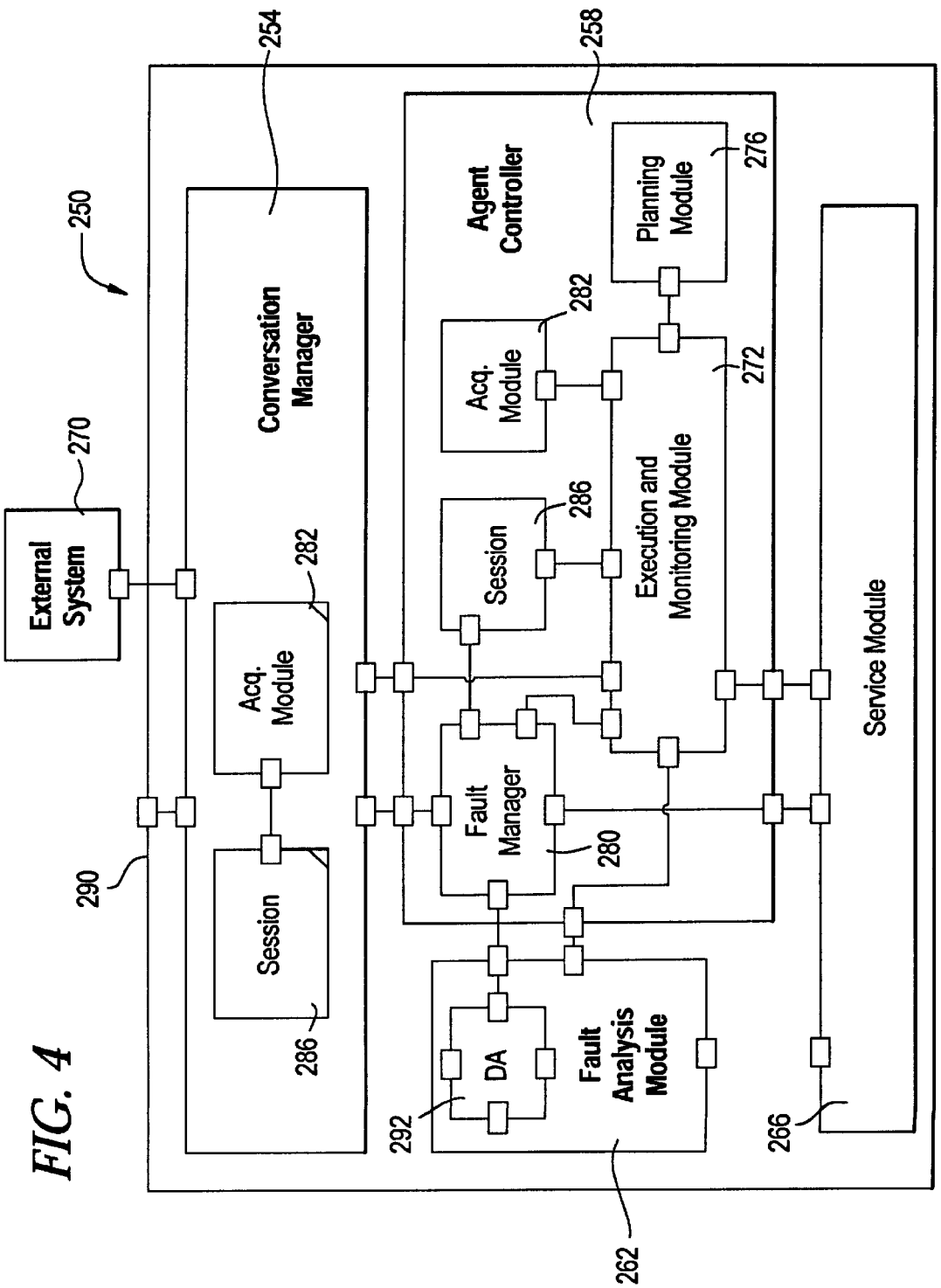

FIG. 4 is a functional block diagram of an intelligent agent constructed in accordance with an exemplary embodiment of the present invention.

Figure 5:
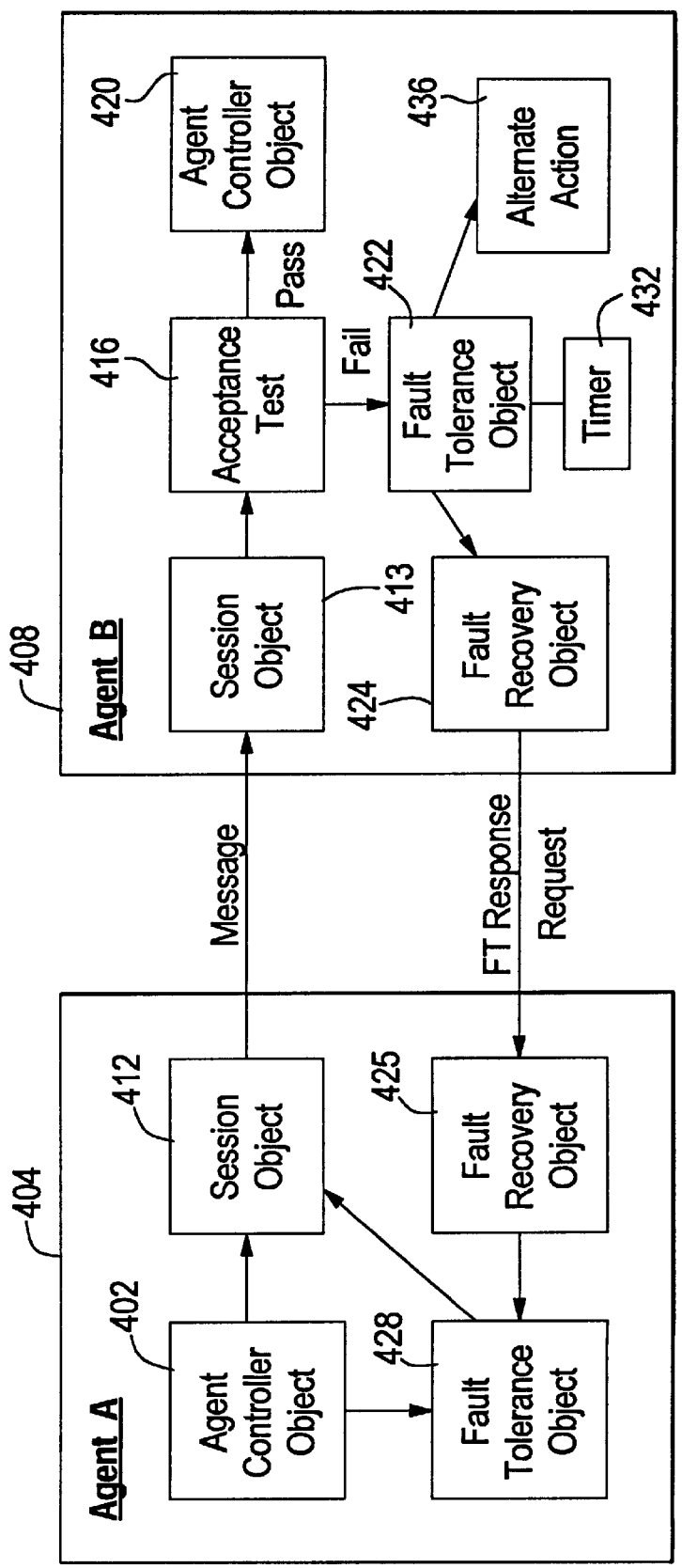

FIG. 5 is a logical block diagram illustrating top-level functions performed to add retry block fault tolerance to a pair of agents in an exemplary embodiment of the present invention.

Figure 6:
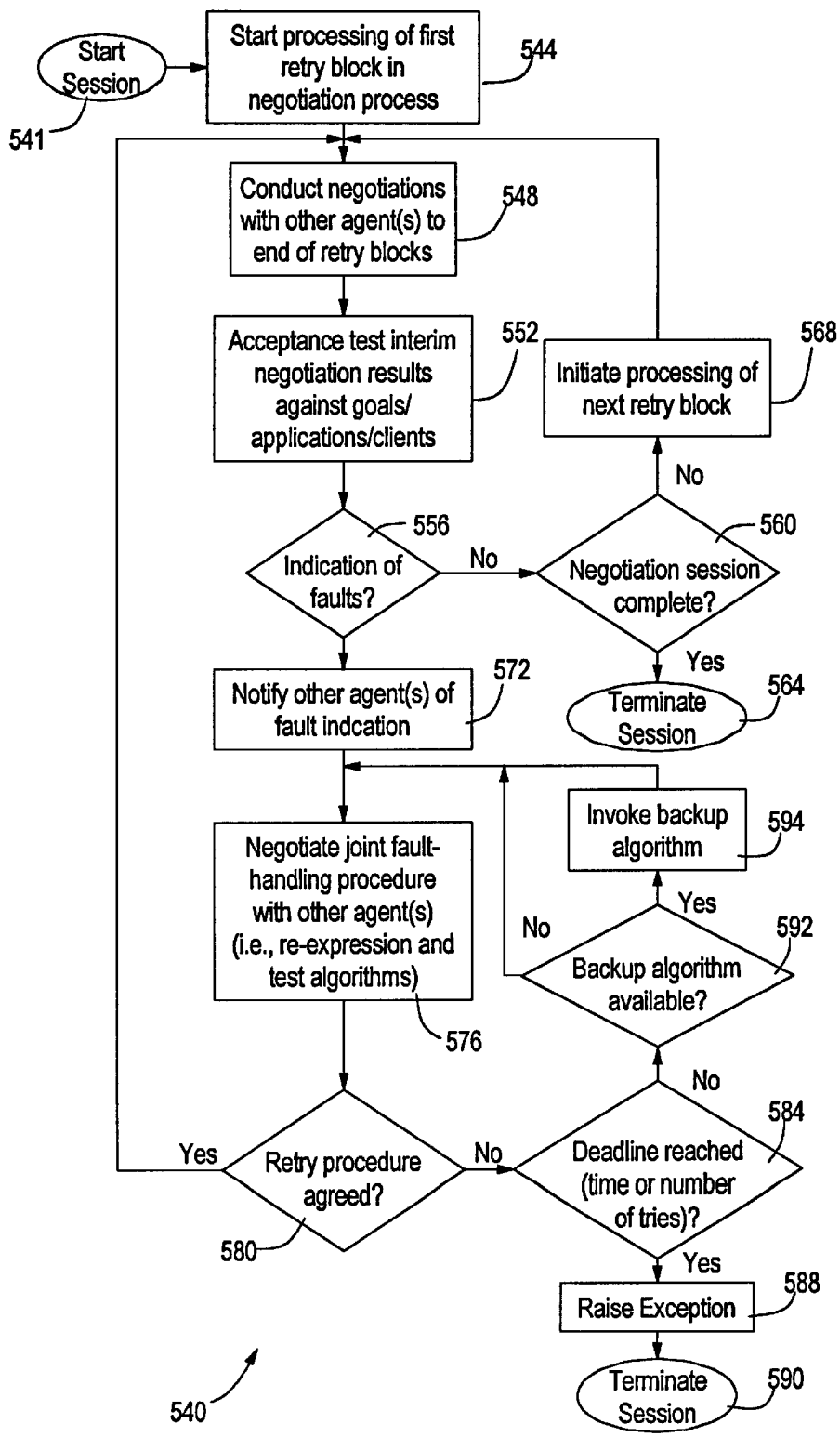

FIG. 6 is a flow diagram illustrating a process for detecting the occurrence of a fault in an agent negotiation according to an exemplary embodiment of the present invention.

Figure 7:
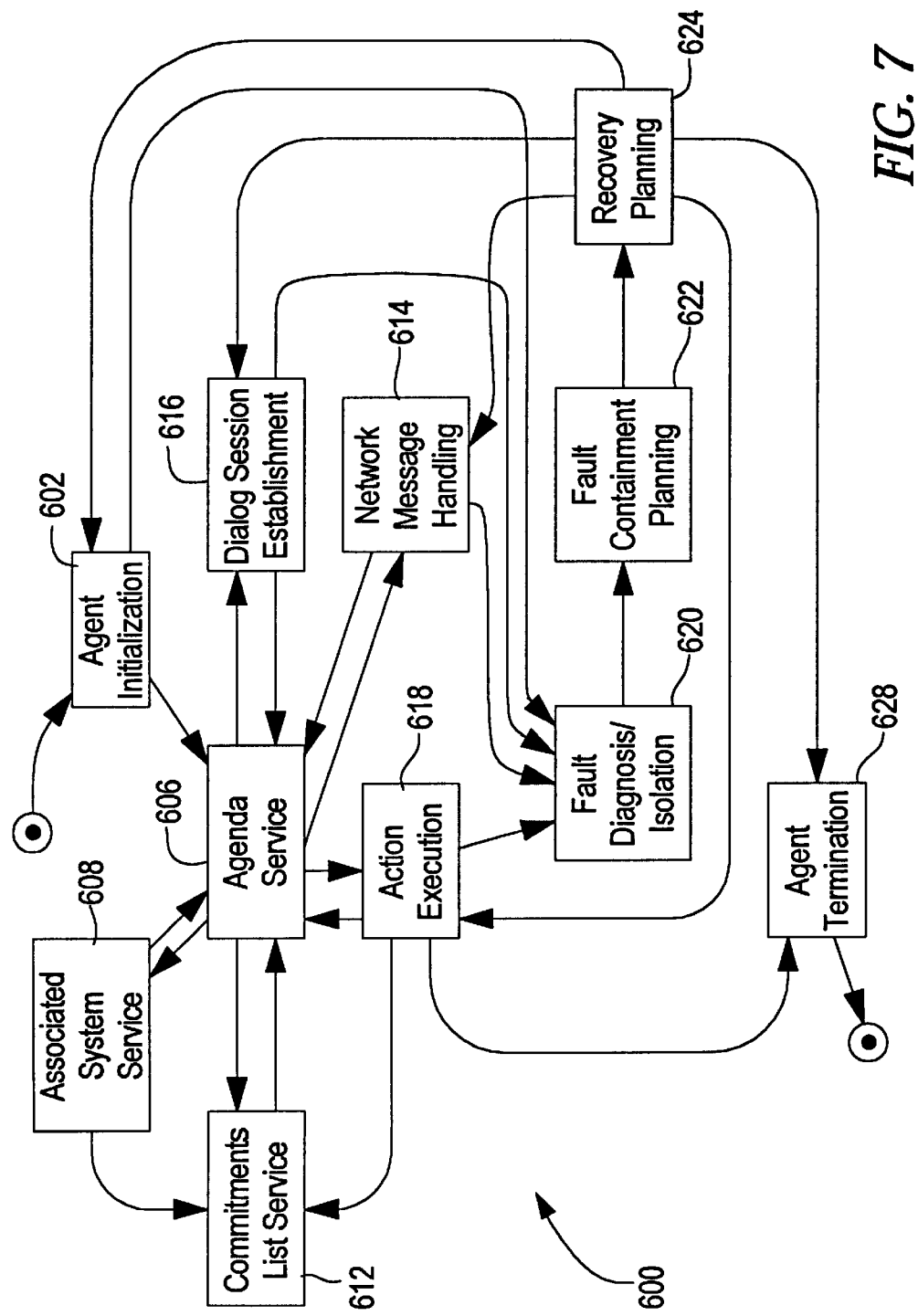

FIG. 7 is a state transition diagram of an exemplary fault-tolerant agent constructed in accordance with one embodiment of the present invention.

Figure 8:
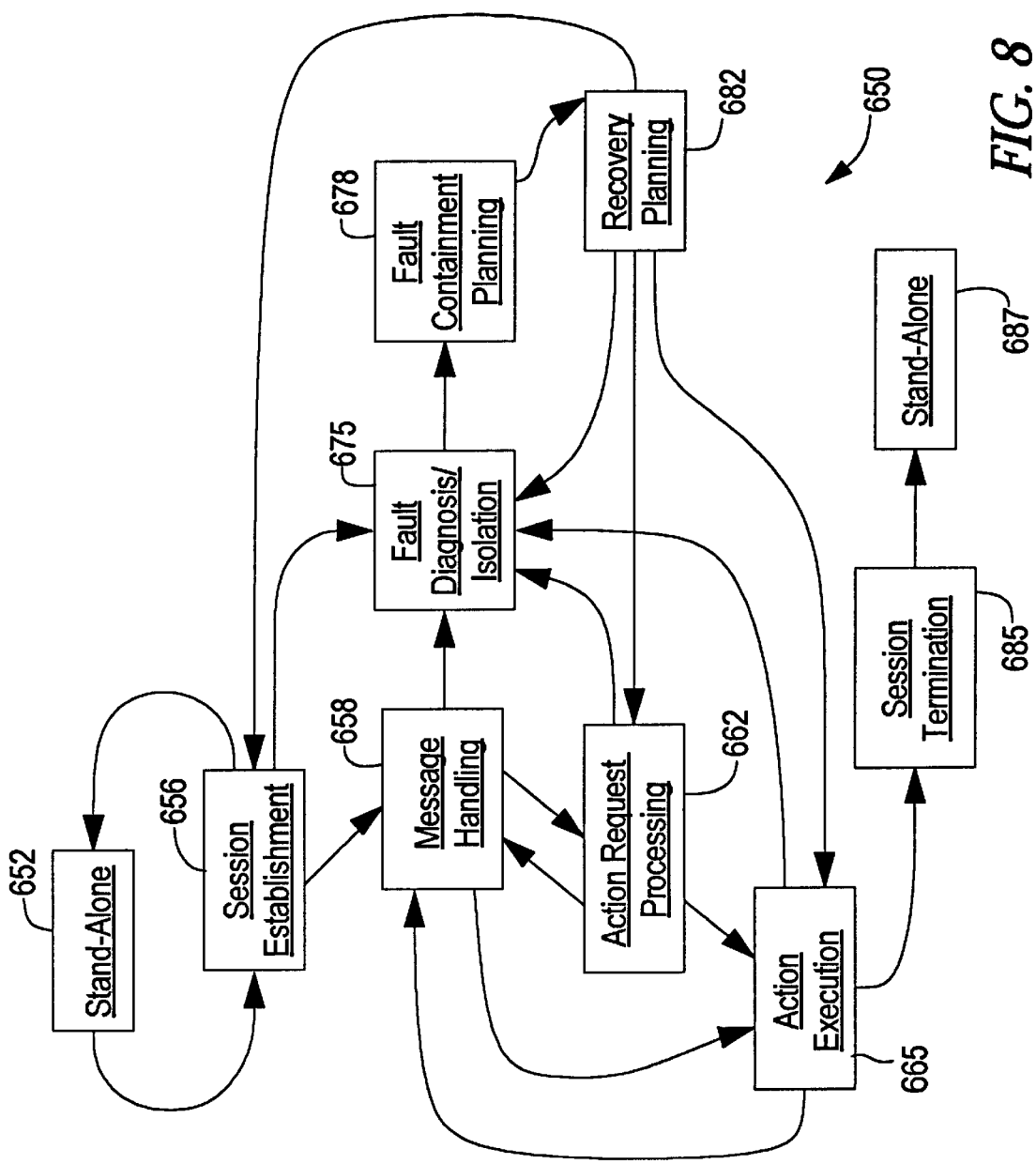

FIG. 8 is a state transition diagram for a fault-tolerant agent-to-agent session process in accordance with an exemplary embodiment of the present invention.

DETAILED DESCRIPTION

The present invention is directed to the merger of fault-tolerance techniques to the emerging technology of intelligent agents. The present invention adapts data-diverse software fault tolerance techniques to the intelligent agent technology to create a distributed computing system including intelligent agents capable of autonomously pursuing a pre-determined goal. The agents are constructed having fault tolerance procedures and protocols which enable the agents to detect the occurrence of a fault. A fault can take the form of a message received by one agent from another agent which is outside of a range of expected values for the message. The range of expected values can be maintained in an acquaintance module at the one agent. In response to the detection of a fault, the one agent can request a fault recovery action, such as a re-expression of message data and a re-transmission of the message from the other agent. In this manner, the distributed computing system provides enhanced reliability and a higher confidence that the agents in the network will succeed in achieving the desired goal.

In the following detailed description, in which like numerals represent like elements throughout the several figures, specific details of techniques and configurations employed in specific embodiments of the present invention are described to facilitate an understanding of the invention. However, it is to be understood that other embodiments of the invention may employ other fault tolerance techniques or system configurations yet still fall within the spirit of the present invention.

Exemplary Operating Environment

Figure 1:
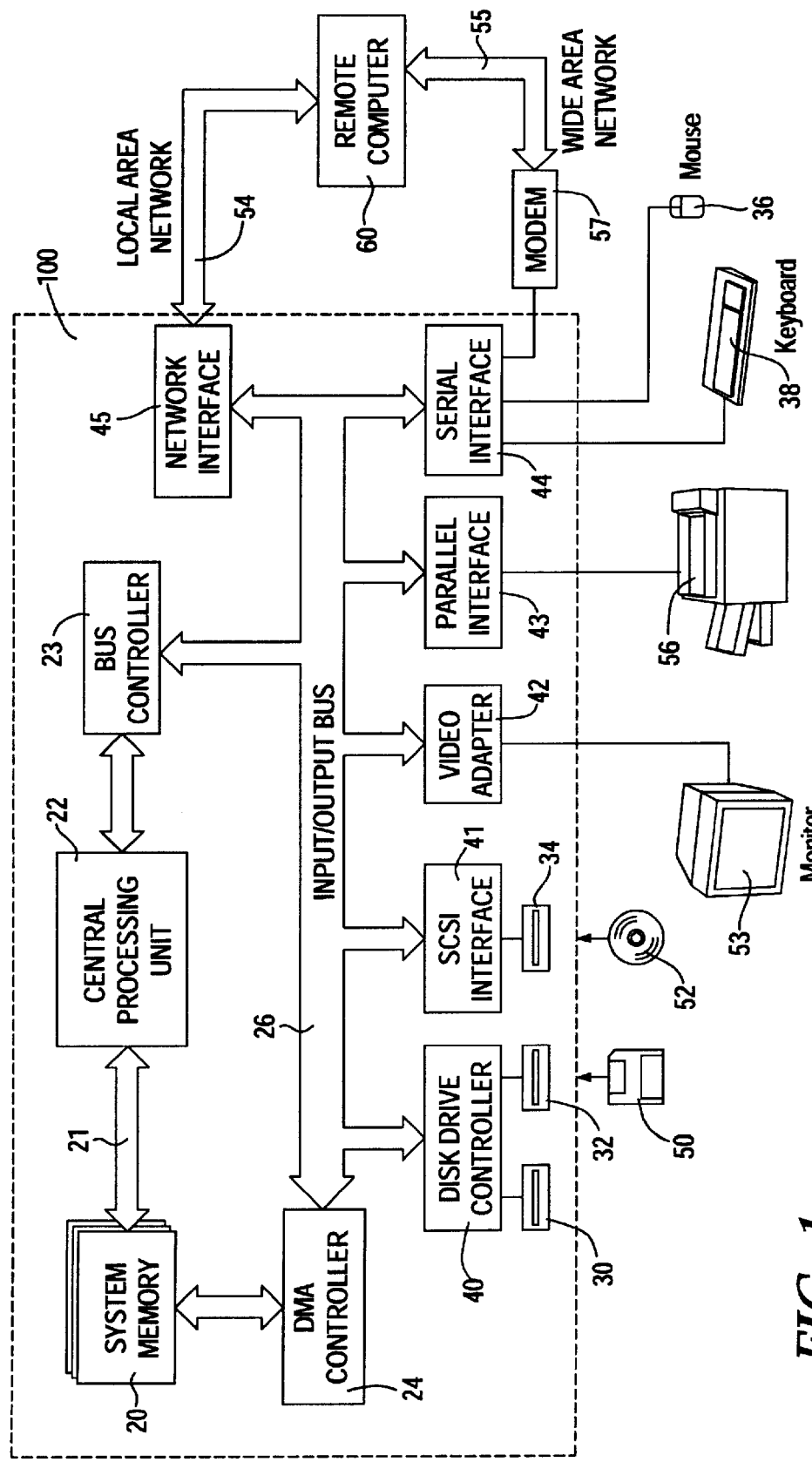
FIG. 1 is a block diagram of a personal computer illustrating an operating environment for an embodiment of the present invention.

FIG. 1 and the following discussion are intended to provide a brief, general description of a suitable computing environment for implementing the present invention.

Although the system shown in FIG. 1 is a conventional personal computer 100, those skilled in the art will recognize that the invention also may be implemented using other types of computer system configurations. The computer 100 includes a central processing unit 22, a system memory 20, and an Input/Output ("I/O") bus 26. A system bus 21 couples the central processing unit 22 to the system memory 20. A bus controller 23 controls the flow of data on the I/O bus 26 and between the central processing unit 22 and a variety of internal and external I/O devices. The I/O devices connected to the I/O bus 26 may have direct access to the system memory 20 using a Direct Memory Access ("DMA") controller 24.

The I/O devices are connected to the I/O bus 26 via a set of device interfaces. The device interfaces may include both hardware components and software components. For instance, a hard disk drive 30 and a floppy disk drive 32 for reading or writing removable media 50 may be connected to the I/O bus 26 through a disk drive controller 40. An optical disk drive 34 for reading or writing optical media 52 may be connected to the I/O bus 26 using a Small Computer System Interface ("SCSI") 41. The drives and their associated computer-readable media provide nonvolatile storage for the computer 100. In addition to the computer-readable media described above, other types of computer-readable media may also be used, such as ZIP drives or the like.

A monitor 53 or other type of display device is connected to the I/O bus 26 via another interface, such as a video adapter 42. A parallel interface 43 connects synchronous peripheral devices, such as a laser printer 56, to the I/O bus 26. A serial interface 44 connects communication devices to the I/O bus 26. A user may enter commands and information into the computer 100 via the serial interface 44 using an input device, such as a keyboard 38, a mouse 36 or a modem 57. Other peripheral devices (not shown) may also be connected to the computer 100, such as speakers or a scanner.

A number of program modules may be stored on the drives and in the system memory 20. The system memory 20 can include both Random Access Memory ("RAM") and Read Only Memory ("ROM"). The program modules control how the computer 100 functions and interacts with the user, with I/O devices or with other computers. Program modules include routines, operating systems, application programs (such as fault-tolerant intelligent agents), data structures, and other software or firmware components. An exemplary embodiment of the present invention can be a program module stored on the drives or in the system memory 20 of the computer 100.

The computer 100 may operate in a networked environment using logical connections to one or more remote computers, such as remote computer 60. The remote computer 60 may be a server, a router, a peer device or other common network node, and typically includes many or all of the elements described in connection with the computer 100. In a networked environment, program modules and data may be stored on the remote computer 60. The logical connections depicted in FIG. 1 include a local area network ("LAN") 54 and a wide area network ("WAN") 55. In a LAN environment, a network interface 45, such as an ethernet adapter card, can be used to connect the computer 100 to the remote computer 60. In a WAN environment, the computer 100 may use a telecommunications communication device to establish a connection, such as the modem 57. It will be appreciated that the network connections shown are exemplary and other means of establishing a communications link between the computers may be used.

Figure 2:
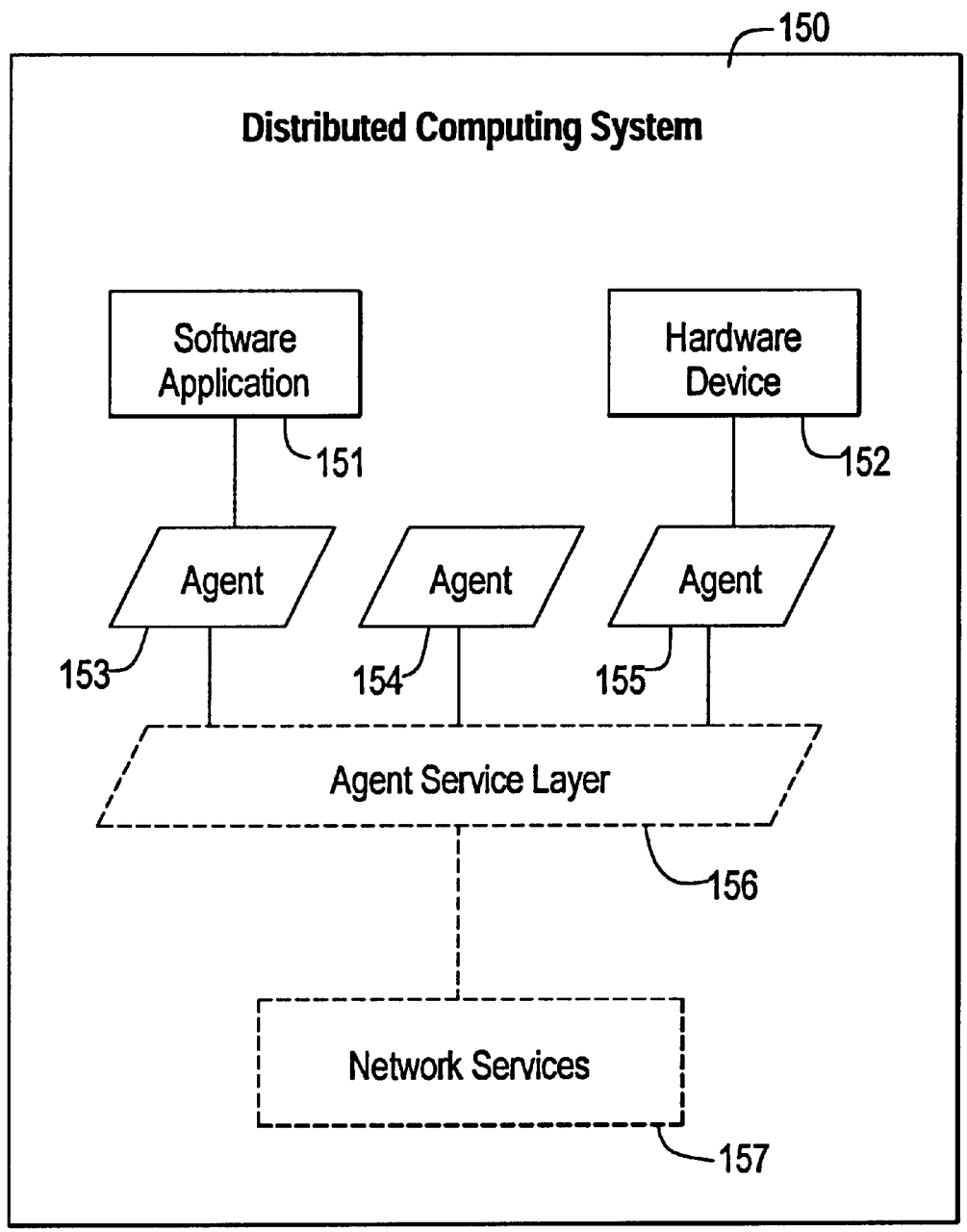
FIG. 2 is a functional block diagram of a distributed computing system which makes use of fault-tolerant agents in accordance with an exemplary embodiment of the present invention.

FIG. 2 is a functional block diagram of a distributed computing system 150 which makes use of fault-tolerant agents in accordance with an exemplary embodiment of the present invention. The distributed computing system 150 can employ intelligent agents in two ways. The first way is to enhance the integration and interoperability of systems associated with the distributed computing system 150, such as a software application 151 or a hardware component 152. In this case, an agent is associated with a particular system and provides a set of services which support the interaction of the associated system with other systems for the interchange of instructions, information, goals, and requests for support. For instance, in the disclosed embodiment, agent 153 is associated with the software application 151, and agent 155 is associated with the hardware component 152.

The second application of intelligent agents is as entities which independently perform an activity or provide a service in the distributed computing system 150. For example, an agent can provide a mathematical transformation of a type of data, such as a coordinate transformation or currency exchange. These independent agents conduct direct interactions with other agents. Agent 154 is an example of such an agent. In either case, the location of an agent in the distributed computing system 150 is arbitrary —any computational device within the distributed computing system 150 which is capable of executing the instructions for agent operation may be used.

Supporting agent interactions are the agent service layer 156 and the network services 157. The agent service layer 156 supports the identification of those agents within the distributed computing system 150 that provide capabilities required by an agent to achieve its goals. The network services 157 provide message routing and delivery which support agent interactions.

Figure 3:
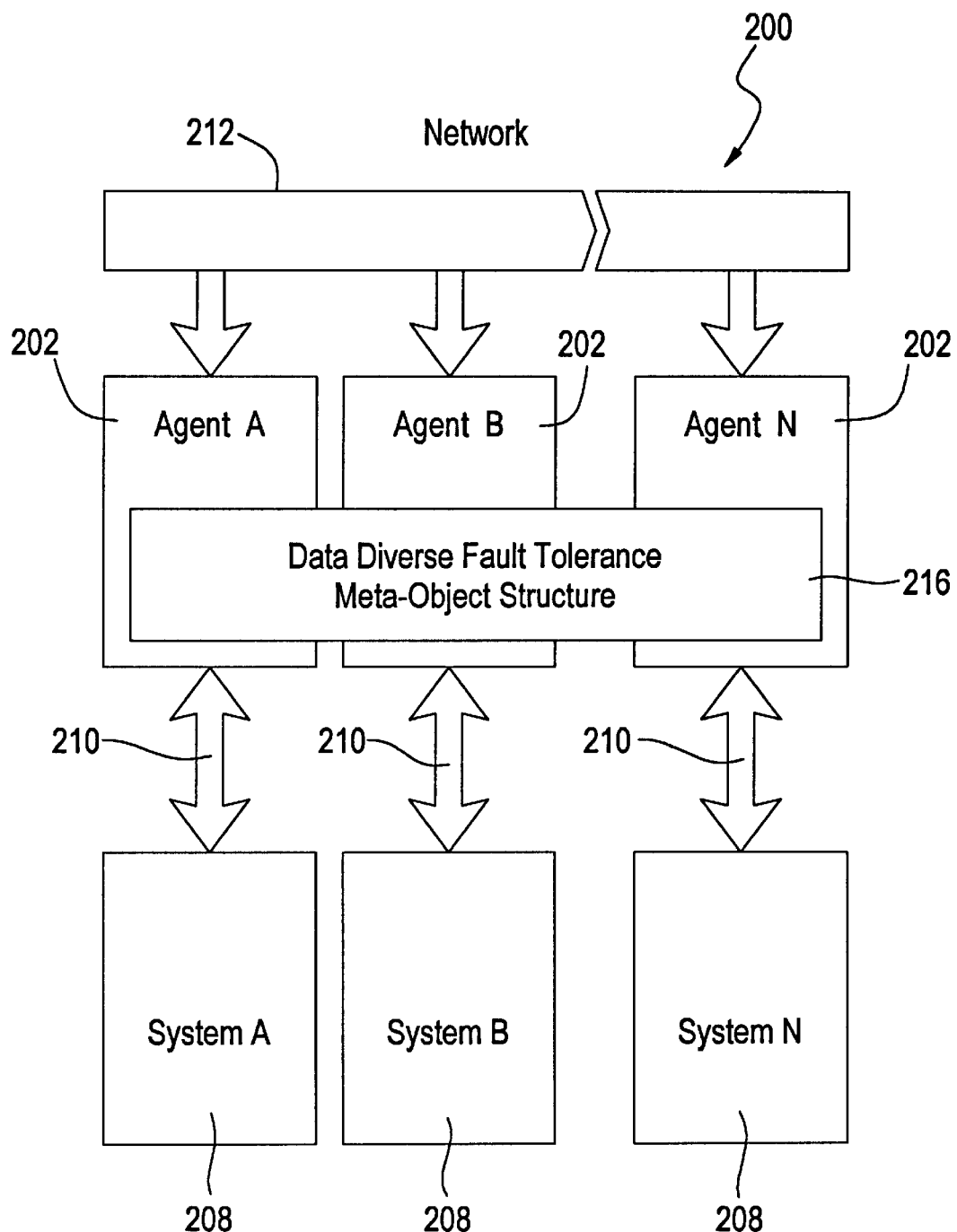

FIG. 3 is a functional overview of a distributed computing system having cooperative intelligent agents constructed in accordance with an exemplary embodiment of the present invention. FIG. 3 illustrates a group of autonomous computer systems, such as the computer 100, operating as nodes in a distributed computing system 200 that must interact to achieve mutual or global goals. An agent 202 constructed in accordance with the disclosed embodiment is associated with a system 208 or is in communication with the system 208 through a system interface 210. The agents 202 represent their respective systems 208 to the other systems 208 in the distributed computing system 200. The agent 202 is discussed in greater detail below with respect to FIG. 4.

An agent 202 cooperates with other agents 202 over the network 212 to accomplish tasks using mutually agreed-upon protocols for interaction and acquaintance modules describing the behavior of the agent 202 owning the acquaintance module as well as other agents 202 in the distributed computing system 200. The acquaintance modules are part of each agent and are discussed in greater detail below with respect to FIG. 4. Information and activities in the distributed computing system 200 are distributed among the several systems 208. Distributed composite objects often consist of groups of subsidiary or component objects residing in different locations, together with relationships liking or connecting them. A feature of the distributed computing system 200 architecture is that the systems 208 are not highly dependent on each other for the performance of local tasks. The distributed computing system 200 thus has a degree of robustness in the graceful degradation sense, but not true fault tolerance. The disclosed embodiment adapts modern software fault tolerance techniques and integrates them into multi-agent systems, including DOM-based systems.

FIG. 3 also depicts a distributed fault tolerance structure 216, spanning the agents 202, to represent information associated with cooperative fault detection, diagnosis, and recovery actions being performed by multiple agents 202. The agents 202 interface individually with their respective systems 208. Each agent 202 represents its respective system 208 to other systems 208 though the respective agents 202 of the other systems 208. Distributed objects span two or more agents 202. The agents 202 collaborate to manage the distributed objects as the agents 202 evolve through the performance of distributed tasks. The distributed fault tolerance structure 216 houses the data conditioning, testing, and control functions that carry out the fault tolerance operations, as well as the state information that represents specific instantiated data-diverse operations in progress, discussed in further detail below.

FIG. 4 is a functional block diagram of an exemplary agent 250 constructed in accordance with one embodiment of the present invention. FIG. 4 illustrates the software modules which allow the agent to autonomously carry out tasks with enhanced reliability through fault tolerance procedures and protocols. The agent 250 includes four major components: a conversation manager 254, an agent controller 258, a fault analysis module 262, and a service module 266. Each of these components is discussed in detail below.

The service module 266 is a placeholder for a user-developed module. For example, the user can use the service module 266 to provide application-specific agent capabilities including interfacing to other, non-agent-based software applications. A set of interfaces are defined for the service module 266 which support interaction with the fault analysis module 262 and the agent controller 258.

The agent controller 258 provides the control capabilities of the agent. The agent controller 258 further includes five subcomponents: an execution and monitoring module 272, a planning module 276, a fault manager 280, an acquaintance module 282, and, when the agent is conducting negotiations with other agents, one or more sessions 286. Each of these subcomponents is discussed in greater detail below.

The execution and monitoring module 272 is the principal control mechanism of the agent 250. When the agent 250 is launched, the execution and monitoring module 272 manages the initialization of other agent controller 258 subcomponents as well as the conversation manager 254, the fault analysis module 262, and the service module 266. The execution and monitoring module 272 maintains a commitment table including any commitments of the agent 250 and initiates those actions at the appropriate times. Commitments are the actions that an agent has committed to complete in the future, as a result of negotiations or in response to external events.

As events occur, the execution and monitoring module 272 determines whether the event represents an action related to a current commitment or requires the planning of a new activity to respond to the event. Where the event relates to current commitments, the execution and monitoring module 272 determines the status of the commitment, which may require new planning. If new planning is required, the planning module 276 is invoked, which generates a plan of actions required to address the event. The execution and monitoring module 272 then uses the plan to modify the commitment table and issues control signals to the other agent 250 components to accomplish the plan.

Central to the operation of the agent 250 is interaction with other agents. Concurrent interactions with multiple agents are supported. These concurrent interactions, mediated by the conversation manager 254 under control of the agent controller 258, are effected by sessions 286. One or more sessions 286 are required to accomplish interaction with another agent. The execution and monitoring module 272 monitors session 286 activity.

Information describing the other agents involved in the interactions is maintained in the acquaintance module 282 (provided to the execution and monitoring module 272). A technique known as multiple containment can be used to allow access to the same instances of these subcomponents from within the conversation manager 254 and agent controller 258 as if a copy existed in each. The acquaintance module 282 includes information relating to other agents in the distributed computing system, such as context, protocol, and behavior.

The fault manager 280 monitors the fault status of the conversation manager 254, the fault analysis module 262, the service module 266, and the sessions 286. When a fault is detected, the fault manager 280 immediately assesses the nature of the fault and determines if an action can be taken directly by the component reporting the fault to contain or circumvent the fault. If the fault can be resolved in this manner, the fault manager 280 notifies the reporting component to take the necessary action, and the occurrence of the fault is reported to the execution and monitoring module 272 for event history maintenance. No other action is taken by the execution and monitoring module 272. If the fault cannot be resolved, the execution and monitoring module 272 is notified and assessment is initiated to determine an alternative course of action to resolve the fault condition.

The conversation manager 254 provides interface services for the agent 250 to an agent service layer 290 and other agents via the external system 270. All interactions with other agents or the agent service layer 290 are mediated by the external system 270. Under control of the agent controller 258, the conversation manager 254 registers with the agent service layer 290 when the agent 250 is initialized. The agent service layer 290 provides a set of capabilities that allow the agent 250 to identify other agents that provide services in which the agent 250 is interested-essentially a "yellow pages". When the agent 250 identifies a need for an externally provided service, it queries the agent service layer 290 to identify other agents which have registered an ability to provide the required service. The interaction with the agent service layer 290 is conducted via a session 286 as described below. The acquaintance module 282 is the internally maintained directory of those identified service-providing agents.

Negotiations between the agent 250 and other agents can be initiated in two ways. One is on receipt by the agent 250 of a control signal from the execution and monitoring module 272 to start a session with a specified agent. In this case, the conversation manager 254 instantiates an instance of a session 286 with the session 286 managing the interaction. Within the session 286, a conversation initiator (not shown) is created. The conversation initiator provides a state machine representation required to engage in a session conversation as an initiator of that conversation.

In the other case, the conversation manager 254 receives a request from another agent to engage in a negotiation. This requires the conversation manager 254 to inform the execution and monitoring module 272 of the request. The execution and monitoring module 272 determines whether the request is supportable, and, if so, it notifies the conversation manager 254 that it is authorized to proceed with the negotiation. The conversation manager 254 then instantiates an instance of a session 286 to handle the negotiation. Also within the session 286, a conversation responder (not shown) is created. The conversation responder provides a state machine representation required to engage in a session conversation as a responder to that conversation.

The fault analysis module 262 controls the execution of the software which provides a portion of the fault tolerance capabilities of the agent 250. Under control of the execution and monitoring module 272, the fault analysis module 262 configures and instantiates a data analysis module 292 which is required to support the fault tolerance technique desired. Examples of fault tolerance techniques which can be embodied within the data analysis module 292 are N-Copy Programming or Retry Block fault tolerance techniques. The data to be analyzed is routed to the data analysis module 292 from the conversation manager 254. If a data fault is detected, the fault manager 280 in the agent controller 258 is notified by the data analysis module 292.

The exemplary embodiment supports two modes of operation. In one, the agent 250 is used to assess data only, reporting any faults detected to the agent subscribing to the service. In the other, the fault analysis module 262 is used to assure that data containing faults is not passed on to the service module 266.

FIG. 5 is a functional block diagram of a pair of agents configured with an adapted retry block software fault tolerance technique in accordance with one embodiment of the present invention. Although retry block software fault tolerance is employed in the disclosed embodiment, those skilled in the art will appreciate that other dynamic data-oriented or data-diverse fault tolerance techniques, such as N-Copy Programming, may be used without deviating from the spirit of the invention. FIG. 5 illustrates only message transfers from a first agent ("Agent A") 404 to a second agent ("Agent B") 408. It will be appreciated that message transfers from Agent B 408 to Agent A 404 employ a similar configuration.

Agent A 404 and Agent B 408 are engaged in a negotiation in furtherance of a goal. Session objects 412, 413 have been established between the two agents and support the negotiation. Under non-fault conditions, an agent controller object 402 at Agent A creates and transmits a message from the session object 412 of Agent A 404 to the session object 413 of Agent B 408. A message arriving at Agent B 408 is acceptance tested 416 to determine if the message is a fault. The acceptance test 416 can include comparing the message to an acquaintance module resident at Agent B 408 which contains information defining the expected values for the message. If the message is not a fault, it is forwarded to the Agent B agent controller object 420.

Alternatively, if the message fails the acceptance test 416, information about the fault is provided to a fault tolerance object 422. The fault tolerance object 422 determines what action should be undertaken to rectify the fault. In the worst case, the fault tolerance object 422 determines that the fault is unrecoverable and terminates the session objects 412, 413, thereby ending the negotiation. More likely, the fault tolerance object 422 calls a fault recovery object 424 which issues a request to Agent A, via its fault recovery object 425, to re-express and re-transmit the message.

A fault tolerance object 428 at Agent A re-expresses the message and re-transmits the message to Agent B. The re-transmission may use the original session objects 412, 413, or a new session can be started if the original session protocol is suspected of causing the fault. If success has not been achieved when a timer 432 times out or after a pre-defined number of unsuccessful retries, the Agent B 408 fault tolerance object 422 abandons the fault tolerance technique and takes an alternate action 436, such as a degraded mode of negotiation.

Flow Diagrams and State Diagrams

FIG. 6 is a flow diagram illustrating the process 540 employed by an agent constructed in accordance with an exemplary embodiment of the present invention to detect the occurrence of a fault. The agent is configured to apply the retry block software fault detection technique known in the art. For a more detailed discussion of the retry block fault tolerance technique, the reader is directed to P. E. Ammann and J. C. Knight, "Data Diversity: An Approach to Software Fault Tolerance", IEEE Transactions on Computers Vol. 37, pp.418 –425 (Apr. 1988).

The process 540 starts a session at starting block 541 where two agents have begun a session and attempt to negotiate in furtherance of a mutual goal. For instance, the goal of the session may be to attempt to purchase a given number of shares of stock at a given price. Once the session is initiated, the process 540 proceeds to block 544.

At block 544, a first agent (Agent A) receives a message from a second agent (Agent B) which initiates a first retry block. Those skilled in the art will appreciate that the first retry block can contain data or a request formatted in a first format through the use of a primary retry-block algorithm at Agent B. The process 540 then proceeds to block 548 which indicates that Agent A can continue to conduct simultaneous negotiations with other agents, or that several agents may be involved with the current negotiation. At block 548, Agent A continues conducting negotiations with other agents. The process 540 then proceeds to block 552, where an acceptance test is conducted of the state and products of the retry block. The process 540 then proceeds to decision block 556.

At decision block 556, it is determined whether an indication of a fault exists based on the results of the acceptance test. If the acceptance test indicates that there is no fault, the method proceeds to decision block 560, which tests to determine if the negotiation is complete. If the negotiation is complete, the method proceeds to block 564 where the session is terminated. If the negotiation is not complete, the method proceeds to block 568 and initiates processing the next retry block.

Returning to decision block 556, if the acceptance test indicates the occurrence of a fault, the process 540 proceeds to block 572. A fault can occur in many ways. For instance, information transferred during the interaction can be clearly invalid. To continue with the above example, the if Agent A requested a stock price quote, but the value returned from Agent B is a negative number, then the acceptance test indicates the occurrence of a fault because the acceptance test criteria for Agent B identifies the expected value to be a number greater than zero.

At block 572, Agent A notifies Agent B that a fault was detected. The process 540 then proceeds to block 576 where Agent A issues a request to Agent B to establish a fault tolerance procedure to attempt to rectify the fault. For instance, Agent A can request Agent B to re-express and re-send the information. Those skilled in the art will appreciate that the term "re-expression" means converting the information to a second format using a data re-expression algorithm at Agent B.

At decision block 580, Agent A awaits confirmation from Agent B that Agent B will re-express the information. If Agent B issues a confirmation that it will re-express the information, the method returns to block 548 and awaits the re-expressed information from Agent B. The method then operates as discussed above with respect to the re-expressed information.

Alternatively, if either Agent A times out waiting for a confirmation from Agent B or Agent B indicates that it is unable to re-express the information with the data re-expression algorithm, then the process 540 proceeds to decision block 584. At decision block 584, Agent A determines whether a predetermined number of retries has been exceeded or whether an absolute time limit has been exceeded for the particular negotiation. The values for the number of retries and the absolute time limit can be stored within Agent A. If one of these limits has been exceeded, the process 540 raises an exception at block 588, and the session is terminated at block 590.

However, if at decision block 584 the number of retries and the absolute time limit have not been exceeded, the method proceeds to decision block 592. At decision block 592, Agent A determines whether a backup algorithm is available. The determination can be made by querying Agent B. If the backup algorithm is available, then Agent A, at block 594, alters its request to Agent B to reflect the backup algorithm. The method then proceeds to block 576 where Agent A issues another request to Agent B to supply the information, this time using the backup algorithm.

If at decision block 592 it is detemined that a backup algorithm is not available, then Agent A returns to block 576 and again attempts to establish a fault-tolerance procedure with Agent B using another data re-expression algorithm. The method then proceeds again as discussed above. In this manner, the process 540 is able to detect a fault, such as transferred information containing a value which is outside a range of expected values, and rectify the fault by requesting the agent to re-express and re-send the information.

FIG. 7 is a state transition diagram 600 of an exemplary fault-tolerant agent constructed in accordance with one embodiment of the present invention. The fault tolerance procedures and protocols discussed above are present in several of the states illustrated, such as the agent initialization state 602, the session establishment state 616, the network message handling state 614, and the action execution state 618. Each of these states is discussed in greater detail below. The fault tolerance procedures and protocols can include adapted retry block control functions, information storage structures, data re-expression functions, and acceptance test functions.

The state diagram 600 enters at block 602 at agent initialization. At block 602 the agent is provided with a predetermined set of rules and models governing the agent's behavior during negotiations. During initialization, a fault can occur such as an inability to access a network. If a fault occurs during initialization, control transitions to block 620 for fault diagnosis and isolation. Block 620 is discussed in greater detail below.

When initialization is complete, control transitions to an agenda service state at block 606. In the agenda service state 606, the agent queries a commitments list to determine whether any tasks are pending for execution. The commitments list contains a list of any predetermined tasks which the host computer system has identified to be performed by the agent on behalf of the computer system, such as monitoring a stock price. If the agenda is current (no current tasks remaining), the agent transitions to a commitments list service state at block 612, which calls up any tasks from the commitments list waiting to be performed.

If the agent's associated system, such as the software application 151 (FIG. 2), issues a request to the agent, control transitions to the associated system service state at block 608. The request issued by the associated system can be a request to perform an action, a directive to terminate an executing interaction, a modification to the acquaintance models provided during initialization, a modification to the commitments list, or the like. Once the request has been serviced, or if the request requires some additional action, the agent transitions back to the agenda service state 606. If the request requires some action, such as the execution of a negotiation, control transitions to the action execution state at block 618, discussed below.

The agent can receive an incoming message from another agent over a distributed computing system. In response to an incoming message, the agent first transitions to the network message handling state at block 614. At block 614, the agents exchange network information. The network information can include the relative locations of the agents, the scope of tasks which can be performed by each agent, the latency of the data available from a particular agent, or the like. The network information is helpful to the fault tolerance of the distributed computing system because it can be used to update the acquaintance modules. If a fault occurs at the network message handling state 614, such as a delay in information transfer, while establishing the connection, control transitions to block 620 for fault diagnosis and isolation. Block 620 is discussed in greater detail below. Once the network connection is established, the agent transitions back to the agenda service state 606 and analyzes the message.

If the message is a request to initiate a negotiation, control transitions to the session establishment state at block 616. Likewise, the associated system request discussed above can be a request to initiate the negotiation, and control tnsitions to the session establishment state 616. At block 616, the agent attempts to establish a dialog between itself and the originator of the message to support the negotiation. Once the dialog is established, control returns to the agenda service state 606. If a fault occurs during the session establishment, control transitions to block 620 for fault diagnosis and isolation Block 620 is discussed in greater detail below.

During the negotiation, the originator of the message requests some action from the agent and control transitions to the action execution state at block 618. Likewise, a request from the associated system can require some action, as discussed above, and control transitions to the action execution state 618. In the action execution state 618 the agent negotiates with another agent in furtherance of a goal associated with the action. Those skilled in the art will understand that the negotiation can include commnunication between the agents in accordance with pre-configured knowledge models and goals dependent upon the particular application of the agent. Continuing with the above example, the goal can be the purchase of a given number of shares of stock at a given price. The negotiation can include a request for a price quote for the stock, the receipt of the price quote, an offer to purchase the stock at the given price, and the receipt of an acceptance of that offer. If a fault occurs during the negotiation, control transitions to block 620 for fault diagnosis and isolation.

At block 620, a fault has occurred somewhere in the agent, such as during initialization, session establishment, message handling, or action execution. At block 620, the fault is diagnosed and isolated to determine the cause and originator of the fault. Fault diagnosis can be implemented using the fault tolerance procedures and protocols discussed above. Once the fault is diagnosed, control transitions to fault containment planning state at block 622.

At block 622, a fault containment plan is created to prevent the effects of the fault from propagating beyond the source of the fault. Once the fault containment plan is created, control transitions to a recovery planning state at block 624.

At the recovery planning state 624, a recovery plan is created which describes the action to be taken to rectify the fault. For instance, the recovery plan can return the agent to the state at which the fault was detected to reinitiate the negotiation or a part of the negotiation to overcome the fault. Continuing with the above example, a fault may be triggered by an agent returning a price quote for a stock drastically below the given price. In response, the recovery plan may include returning the agent to the action execution state 618 to request an additional price quote to verify the accuracy of the previous quote. Alternatively, control may transition to another state, such as the session establishment state 616 to reestablish the negotiation, or to a termination state at block 628 if the recovery planning did not produce an acceptable outcome.

FIG. 8 is a state transition diagram for a fault-tolerant agent-to-agent session process 650 in accordance with an exemplary embodiment of the present invention. FIG. 8 differs from FIG. 7 in that the dynamics represented in FIG. 8 are those of the negotiation, rather than those of either agent individually. The process 650 illustrated is an example of a fault-tolerance process for performing the function of the distributed fault tolerance structure 216 depicted in FIG. 3 above. The process 650 enters at block 652 where two or more agents are in stand-alone states with respect to a negotiation. If a first agent, Agent A, issues a request to another agent, Agent B, the process 650 enters a session establishment state at block 656. Establishing a session can include the same procedures as discussed above with respect to the session establishment state 616 of FIG. 7. If a fault is detected during the session establishment, control transitions to fault diagnosis and isolation at block 675, discussed below.

When the session is established, control transitions to the message handling state at block 658. At block 658, the agents within the distributed computing system exchange lower-level topological information, such as each agent's location in the distributed computing system. This type information can be used to assist the individual agents with fault diagnosis in the event of a fault If a fault occurs in the message handling state 658, control transitions to fault diagnosis and isolation at block 675, discussed below.

From the message handling state 658, control transitions to the action request processing state at block 662. At block 662, the agent that received the request processes the request to determine what action to take. Continuing with the previous example, if the request is for a price quote for a stock, the receiving agent determines that preparing a quote for the stock is necessary. Control then tansitions to an action execution state at block 665. However, if a fault occurs during the action request processing, control transitions to fault diagnosis and isolation at block 675, discussed below.

At block 665, the action determined at block 662 is executed. At block 665, the agents in the distributed computing system negotiate toward a goal, such as the purchase of a stock. The negotiation proceeds to conclusion as discussed above, unless a fault is detected in the action execution state 665. If so, then control transitions to fault diagnosis and isolation at block 675.

At block 675, a fault has been detected during the process 650 of establishing or performing a negotiation between two or more agents. At block 675, the fault is diagnosed and isolated to determine the cause and originator of the fault. Fault diagnosis can be implemented using the fault tolerance procedures and protocols discussed above with respect to FIGS. 3 and 4. Once the fault is diagnosed, control transitions to a fault containment planning state at block 678.

At block 678, a fault containment plan is created to prevent the effects of the fault from propagating beyond the source of the fault. Once the fault containment plan is created, control transitions to a recovery planning state at block 682.

At the recovery planning state 682, the process 650 develops a plan to determine the action which will rectify the fault, if possible. For instance, the recovery plan state 682 can return the agent to the state at which the fault was detected to reinitiate the negotiation or a part of the negotiation to overcome the fault Alternatively, control may transition to another state, such as the session establishment state 656 to reestablish the negotiation. If the recovery planning state 682 is unable to produce an acceptable outcome, control returns to the action execution state 665 with a directive to terminate the negotiation.

At the action execution state 665, if the negotiation reaches a successful conclusion, or if a fault occurs from which the process 650 cannot recover, control proceeds to the session termination state at block 685 and terminates the session. From block 685, the process returns to the stand alone state at block 687 and awaits another session.

In brief, a software fault-tolerant technique is implemented in the present invention to achieve a cooperating intelligent agent system capable of detecting and correcting faults that occur during agent interactions. As a result, fault tolerance achieves enhanced reliability while minimizing the use of distributed computing resources, which results in significant benefit to all cooperating agents and their associated systems.

By implementing data-diverse fault-tolerant techniques, the present invention provides a system of cooperating intelligent agents with the ability to determine when information developed during an interaction, information transferred during the interaction, or the interaction itself, results in a fault. If such a fault is detected, the agent detecting the fault will apply the fault-tolerance technique in an attempt to determine the source of the fault and correct the fault.

In summary, the present invention is directed toward a system and method for providing highly-reliable intelligent agents in a distributed computing system by combining a fault-tolerance technique for identifying a fault in an interaction between agents and recovering from the fault. Alternative embodiments will become apparent to those skilled in the art to which the present invention pertains without departing from its spirit and scope. Accordingly, the scope of the present invention is described by the appended claims and is supported by the foregoing description.

What is claimed is:

1. In a distributed computing system including at least one host computer system, a highly-reliable system for performing tasks, comprising:

a plurality of agents, each agent in the plurality of agents having a host system and being capable of pursuing a goal autonomous from the host system associated with the agent, the goal being a solution to a problem defined by one agent in the plurality of agents or the host system associated with the one agent, wherein a first agent in the plurality of agents is associated with at least one system, including a first host system, and is operative for communicating with component in the distributed computing system to receive instructions, information, and requests from the component, the first agent being further operative to receive the goal from the component, the first agent being capable of interacting with a second agent in the plurality of agents using inter-agent conversation facilities in furtherance of the goal through the transmission of a message from the first agent to the second agent, the first agent being still further operative for planning a session with other agents in the plurality of agents for pursuing the goal; and a fault tolerance object resident at the second agent and operative for identifying a fault in the interaction by testing information received from the first agent during the interaction to determine whether the information is inconsistent with information stored in the second agent that describes an expected behavior of the first agent or the systems associated with the first agent, the fault tolerance object further operative to initiate a fault tolerance procedure operative to identify a cause of the fault and, when necessary, to request the first agent to re-express and re-transmit the message from the first agent to the second agent.

2. The system of claim 1, wherein the information stored in the second agent that describes the expected behavior of the first agent or the systems associated with the first agent is contained within an acquaintance module available to the second agent.

3. The system of claim 1, wherein the component is a software application.

4. The system of claim 1, wherein the component is a hardware component.

5. The system of claim 3, wherein the software application is a third agent in the plurality of agents.

6. The system of claim 1, wherein the fault tolerance object comprises pre-defined procedures for executing a data-diverse fault tolerant technique, and wherein the second agent is operative to execute the pre-defined procedures.

7. The system of claim 6, wherein the data-diverse fault tolerant technique comprises a retry-block software fault tolerance technique.

8. The system of claim 6, wherein the data-diverse fault tolerant technique is a N-copy programming technique.

9. The system of claim 6 wherein the second agent is operative to engage other agents in the plurality of agents to perform a portion of the pre-defined procedures.

10. The system of claim 1 wherein the fault tolerance object comprises pre-defined fault tolerance procedures executed in a distributed fashion by at least two of the agents operating cooperatively, a portion of the pre-defined fault tolerance procedures being stored in the second agent.

11. The system of claim 10, wherein the fault tolerance procedures comprise a data-diverse fault tolerance technique.

12. The system of claim 11, wherein the data-diverse fault tolerance technique comprises a distributed adaptation of a data-diverse fault tolerance technique.

13. The system of claim 12, wherein the distributed adaptation of the data-diverse fault tolerant technique comprises a retry block software fault tolerance technique.

14. The system of claim 12, wherein the distributed adaptation of the data-diverse fault tolerant technique is an N-copy programming software fault tolerance technique.

15. The system of claim 10, wherein a distributed object management ("DOM") technique is employed to maintain the fault tolerance procedures and to maintain information pertaining to the at least two of the agents operating cooperatively.

16. In a distributed computing system including a plurality of agents, each agent in the plurality of agents operative for executing a task in furtherance of a goal autonomous from a host system associated with each agent, the goal being a solution to a problem defined by one agent in the plurality of agents or the host system associated with the one agent, a method for enhancing the reliability of an interaction between two agents in the plurality of agents, comprising:

initiating a session between a first agent in the plurality of agents and a second agent in the plurality of agents, the first agent and the second agent each including a portion of a distributed fault tolerance structure containing data conditioning, testing, and control functions to carry out fault tolerance operations between the first agent and the second agent, the session having the goal;

providing to the first agent information related to the second agent, the information related to the second agent comprising information that describes an expected behavior of the second agent;

at the first agent, acceptance testing information related to the session to detect whether the information related to the session is inconsistent with the expected behavior of the second agent, the failure of the acceptance test being indicative of a fault in the session; and in response to a failure of the acceptance test, initiating a fault tolerance procedure making use of the distributed fault tolerance structure to diagnose a cause of the fault, to create a fault recovery plan, and to execute the fault recovery plan.

17. A computer-readable medium in a distributed computing system having computer-executable instructions for enhancing the reliability of interactions between agents in the plurality of agents, comprising:

monitoring an interactive step of an interaction between a first agent in a plurality of agents in the distributed computing system and a second agent in the plurality of agents in the distribute computing system, each agent in the plurality of agents being operative for executing a task in furtherance of a goal, each agent being further operative to execute the task independent of a host system associated with the agent, the goal being a solution to a problem defined by one agent in the plurality of agents or the host system associated with the one agent, the interactive step involving a use of information sent from the first agent to the second agent;

testing the validity of the interactive step being performed in the interaction through the use of fault tolerance techniques distributed among at least the first agent and the second agent by comparing the information sent from the first agent to the second agent with other information that describes an expected behavior of the first agent or the host system associated with the first agent;

informing the first agent and the second agent that the interactive step being performed is invalid; and assisting the first agent and a second agent to reperform the interactive step with a re-expressed version of the information sent from the first agent to the second agent.

18. The computer-readable medium of claim 17, wherein the step of assisting the first agent and the second agent comprises employing a data-diverse fault tolerance technique.

19. The computer-readable medium of claim 18, wherein the data-diverse fault tolerance technique comprises an adapted retry block fault tolerance technique.

20. The computer-readable medium of claim 18, wherein the data-diverse fault tolerance technique comprises an N-copy programming fault tolerance technique.

* * * * *